S. WHEELER.
Sawing-Machines.
No. 137,581.
Patented April 8, 1873.
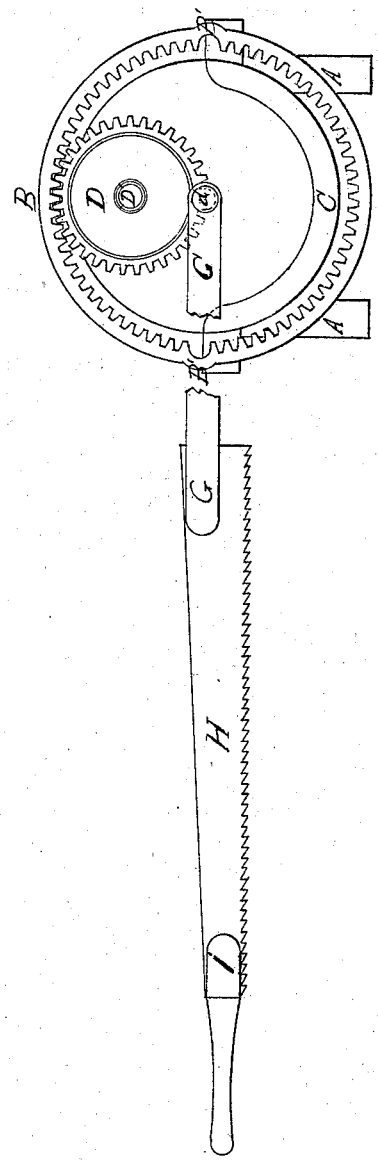
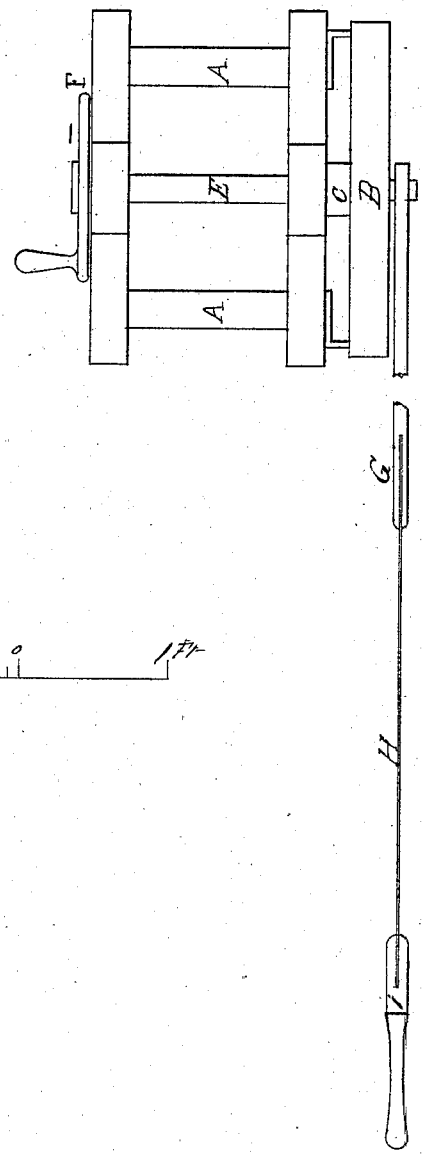

UNITED STATES PATENT OFFICE.

SETH WHEELER, OF ALBANY, NEW YORK.

IMPROVEMENT IN SAWING-MACHINES.

Specification forming part of Letters Patent No. 137,581, dated April 8, 1873; application filed July 24, 1872.

*To all whom it may concern:*

Be it known that I, SETH WHEELER, of the city and county of Albany and State of New York, have invented certain Improvements in Sawing-Machines, of which the following is a specification:

My invention consists in adapting a peculiar parallel motion to driving reciprocating saws, by which combination I produce a machine well calculated to meet the demands of farmers and others requiring a simple, cheap, and durable machine, that may be driven by railway or lever horse-powers, as ordinarily constructed, or by light steam or water power.

The most simple machine has the saw attached directly to a crank-pitman, but the excessive rocking motion imparted to the saw by this arrangement causes it to bound at a very low speed; consequently, the machine is slow, and, though simple and cheap, is not popular.

The machine in greatest favor as regards efficiency has the pitman attached to a slide moving in ways, the saw also being secured to the slide. This, of course, moves the saw in perfect line, and may be run at high speed with sufficient power; but the friction on the slide is so considerable when the saw is forced to its work that moderate power does not admit of it. The cost of this machine is much more than the first described, in consequence of the slides, ways, and frame-work necessary to support them, so that, while this is really an effective machine, its use is comparatively limited, owing to its cost and power required to operate it successfully.

My invention has the simplicity of the first machine, in the saw being attached directly to the pitman, and I obtain the requisite straight movement of the saw without recourse to slides, and consequent friction and expense. By it I am also enabled to produce an efficient, durable, and low-priced portable saw-mill for cutting logs into boards, which may be driven by one horse, if desired.

The drawing shows my invention arranged for driving a drag-saw.

Figure 1 is a side elevation of the machine. Fig. 2 is a plan of the same.

A is the frame of the machine. B is a stationary internal wheel, concentric with the driving-shaft. C is a balance-wheel secured to the driving-shaft. At a point distant from its center one-half the radius of the wheel B is a stud carrying the pinion D, which meshes with the wheel B. The weight of the pinion D and stud is counterbalanced by the rim of the balance-wheel extending only partially around its circumference. $d$, a wrist-pin to receive the pitman, two spaces in the pinion being cast solid to admit of securing the pins solidly, a corresponding space being formed at B' to receive this wide tooth. E is the driving-shaft; F, driving coupling or pulley; G, pitman; H, saw; I, handle for raising and placing the saw.

Motion being given the balance-wheel C, through the shaft E, in the direction indicated by the arrows, will cause the pinion D to move in contact with the wheel B, revolving upon its own axis and carrying the stud $d$ on a right line between the spaces B'.

Ordinarily, no movement of the wheel B is necessary, the pitman usually being several feet in length; consequently, the rock of the saw caused by its deflection from the line of travel of the wrist-pin will be scarcely noticed in cutting through a log thirty inches in diameter; but if desirable to use a short connection, all rock may be prevented by allowing the wheel B to turn slowly in accordance with the passage of the saw through the log, thus keeping the line of the teeth constantly parallel with the line of motion of the wrist-pin.

I claim—

The internal wheel B and pinion D, when arranged, substantially as herein described, for operating reciprocating saws.

SETH WHEELER.

Witnesses:
E. B. WHEELER,
C. F. HULL.